Sept. 22, 1953     H. W. DUTCHER     2,652,626
POWER-OPERATED SHEARS

Filed Jan. 21, 1952     2 Sheets—Sheet 1

Harold W. Dutcher
INVENTOR.

Sept. 22, 1953  H. W. DUTCHER  2,652,626
POWER-OPERATED SHEARS

Filed Jan. 21, 1952  2 Sheets-Sheet 2

Harold W. Dutcher
INVENTOR.

BY *Clarence A. O'Brien*
*and Harvey B. Jackson*
Attorneys

Patented Sept. 22, 1953

2,652,626

UNITED STATES PATENT OFFICE 2,652,626

POWER-OPERATED SHEARS

Harold W. Dutcher, San Antonio, Tex., assignor of twenty-five per cent to Harry R. Morgan, San Antonio, Tex.

Application January 21, 1952, Serial No. 267,351

4 Claims. (Cl. 30—216)

The present invention relates to new and useful improvements in shears for trimming lawns and for other purposes and more particularly to electrical or power operated means therefor.

An important object of the invention is to provide a lawn trimmer equipped with a V-shaped stationary blade and a triangular or tapered movable blade mounted in cutting cooperation with the stationary blade to swing across the inner cutting edges of the latter to provide a double cutting action for the movable blade during its back and forth movement.

Another object is to provide stationary and movable cutters mounted as a unit to a motor housing and further to provide interchangeable cutting units for mounting the motor either horizontally or perpendicularly with respect to the cutting blades.

A further object is to provide a device of this character of simple and practical construction which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
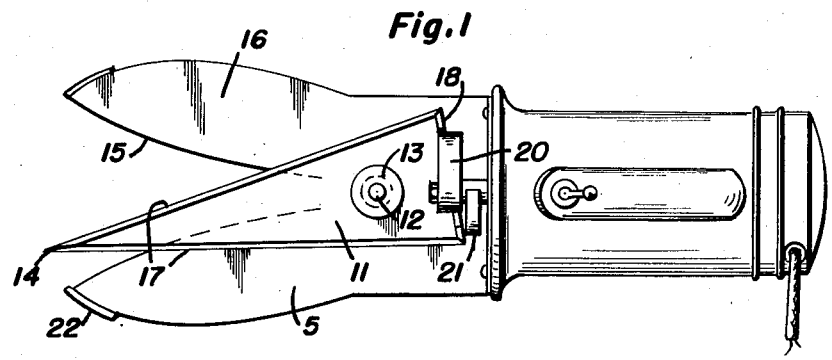
Figure 1 is a top plan view.
Figure 2:
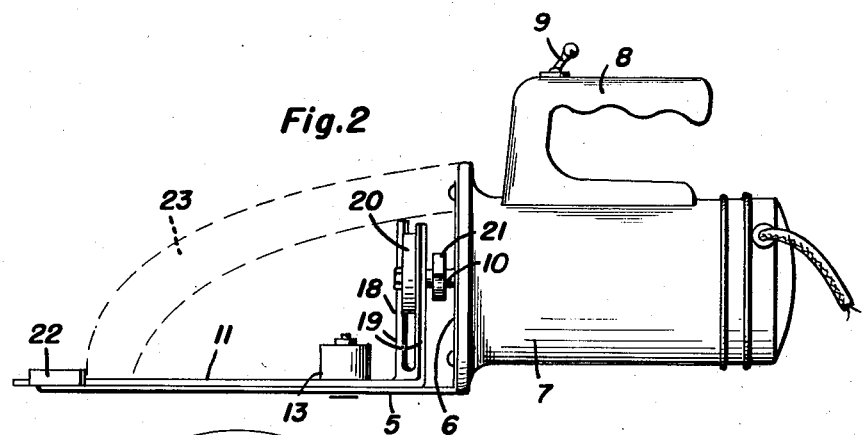
Figure 2 is a side elevational view.

Referring now to the drawings in detail, and first with respect to the form of the invention illustrated in Figures 1 to 4 inclusive, the numeral 5 designates a V-shaped stationary blade or cutter having a perpendicular attaching plate 6 at its inner or rear end for attaching in confronting relation to the front end of an electric motor housing 7 to position the motor horizontally or parallel to the cutter. A handle 8 with switch 9 is mounted on top of the motor housing and the shaft 10 of the motor projects forwardly to overlie the cutter 5.

A triangular or tapered cutter or blade 11 is swingably mounted on top of stationary cutter 5 by means of a pivot pin 12 enclosed in a grease cup or chamber 13 and in a position with the pointed end 14 of the movable cutter 11 extending in a forward direction to swing across the sharpened inner or opposing edges 15 of the leg portions 16 of the stationary cutter. Both side edges of movable cutter 11 are also sharpened as shown at 17.

A perpendicular yoke 18 rises from the rear end of movable cutter 11 to provide upstanding legs 19 between which an elliptical cam 20 is positioned and which is eccentrically mounted on the front end of shaft 10 to oscillate the movable cutter. A vibration dampener 21 is also mounted on the shaft 10 behind the cam 20.

Arcuate shoes 22 are integrally formed or may be welded or otherwise suitably secured on top of the leg portions 16 of stationary cutter 5 at the tips of the latter to facilitate sliding of the device along the ground and a substantially V-shaped safety shield 23 has its ends welded or otherwise suitably fixed to the outer front edges of leg portions 16 of the stationary cutter 5 and is arched rearwardly over the stationary cutter and attached to the upper edge of attaching plate 6 to provide the shield with a V-shaped open front 24 and open sides 25 to receive uncut grass at the front of the shield and discharge severed grass at the sides thereof.

Figure 5:
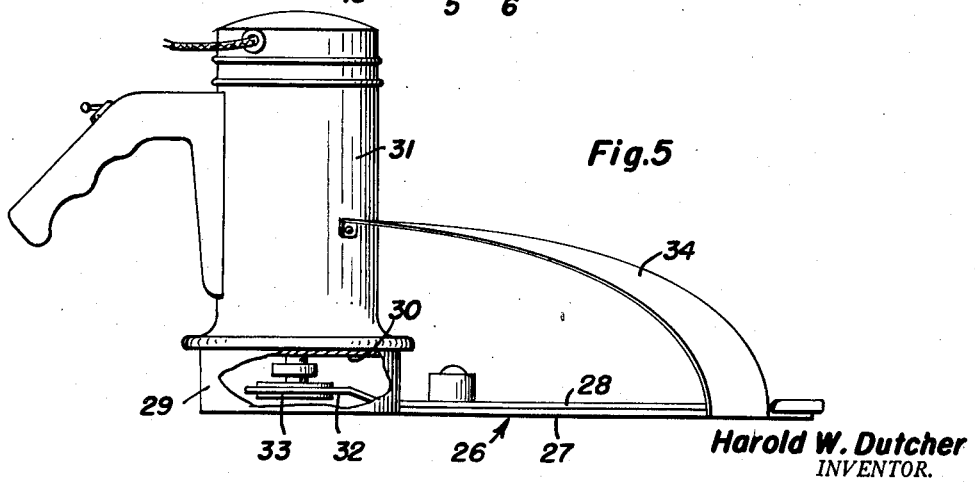
Figure 5 is a side elevational view of a modified cutting unit for use with the motor in a perpendicular position.
Figure 3:
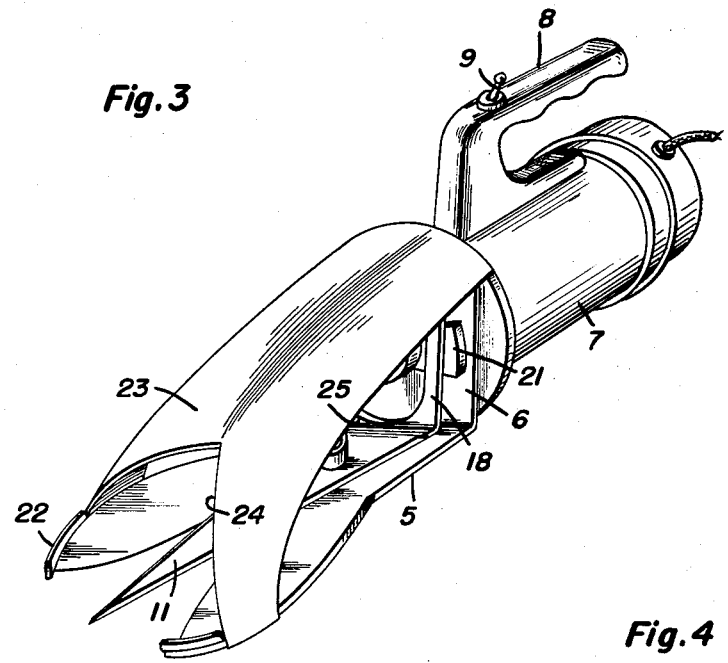
Figure 3 is a perspective view.
Figure 4:
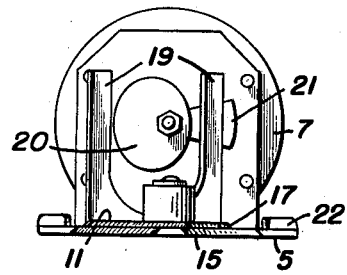
Figure 4 is a front elevational view.
Figure 6:
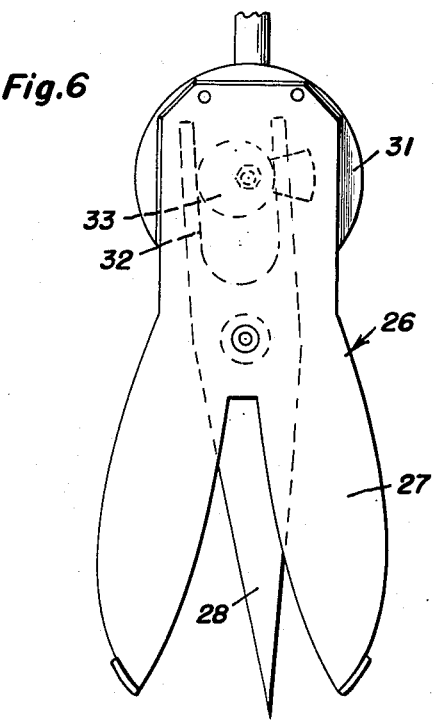
Figure 6 is a bottom plan view thereof.

In Figures 5 and 6 the cutting unit is shown generally at 26 and is composed of the stationary cutter 27 and movable cutter 28 swingably mounted thereon as heretofore described. The rear portion of stationary cutter 27 is found with perpendicular walls 29 at the top of which is an attaching plate 30 secured to the end of motor housing 31 to position the motor perpendicularly while the cutting unit is operated in a horizontal position. The rear end of the movable cutter 28 is formed with a yoke 32 in which an eccentric cam 33 works and is driven by the motor.

A V-shaped shield 34 is also arched over the cutting unit. While the herein disclosed invention is shown operated by an electric power source any suitable prime mover may be employed for this purpose.

In the operation of the device the stationary cutter 5 is moved over the ground to guide the grass between the legs 16 thereof and the movable cutter 11 is rapidly swung back and forth across the stationary cutter by the eccentric cam 20, to sever the grass. The double cutting edges 17 of the movable cutter cut the grass upon the movement thereof in both directions.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described my invention, what is claimed as new is:

1. In a power operated grass trimmer, the combination of a portable power unit including a rotatable eccentric cam, and a cutting unit detachably carried by the power unit and comprising a V-shaped stationary cutter, a pivoted double-edged blade carried by the stationary cutter for swinging back and forth across the crotch portion of the latter, a yoke at the rear end of the blade in which the cam is positioned for actuating the blade, and an arcuate shield attached at one end to the front end of the stationary cutter and attached to its other end to the power unit and arched over the cutting unit.

2. In a power operated grass trimmer, the combination of a portable power unit including a rotatable eccentric cam, and a cutting unit detachably carried by the power unit and comprising a V-shaped stationary cutter, a pivoted double-edged blade carried by the stationary cutter for swinging back and forth across the crotch portion of the latter, a yoke at the rear end of the blade in which the cam is positioned for actuating the blade, and an arcuate V-shaped shield attached at its diverging end portion to the diverging front ends of the stationary cutter and attached at its other end to the power unit and arched over the cutting unit.

3. In a power operated grass trimmer, the combination of a portable power unit including a rotatable eccentric cam, and a cutting unit detachably carried by the power unit and comprising a V-shaped stationary cutter, an attaching plate rising from the rear end of the cutter adapted for attaching in a perpendicular position to the power unit to hold the cutter horizontally, a double-edged blade pivoted to the stationary cutter for swinging back and forth across the crotch portion of the latter, and an upstanding yoke at the rear end of the blade in which the cam is positioned for actuating the blade.

4. In a power operated grass trimmer, the combination of a portable power unit including a rotatable eccentric cam, and a cutting unit detachably carried by the power unit and comprising a V-shaped stationary cutter, an attaching plate at the rear end of the cutter and offset from the plane of the cutter and adapted for attaching the lower end of a perpendicular power unit to support the cutting unit horizontally, a double-edged blade pivoted to the stationary cutter for swinging back and forth across the crotch portion of the latter, a yoke at the rear end of the blade in which the cam is positioned for actuating the blade, and an arcuate shield attached at one end to the front end of the stationary cutter and attached at its other end to the power unit and arched over the cutting unit.

HAROLD W. DUTCHER.

References Cited in the file of this patent

UNITED STATES PATENTS

| Number | Name | Date |
| --- | --- | --- |
| 196,724 | Tallman | Oct. 30, 1877 |
| 287,794 | Benson et al. | Nov. 6, 1883 |
| 757,429 | Arce | Apr. 19, 1904 |
| 847,706 | Sparks | Mar. 19, 1907 |
| 1,352,326 | Swatzell | Sept. 7, 1920 |
| 1,411,440 | Kocourek | Apr. 4, 1922 |
| 1,838,690 | Lepiane et al. | Dec. 29, 1931 |

FOREIGN PATENTS

| Number | Country | Date |
| --- | --- | --- |
| 560,112 | Germany | Sept. 28, 1932 |